(12) United States Patent
Drapeau et al.

(10) Patent No.: US 11,704,673 B1
(45) Date of Patent: Jul. 18, 2023

(54) SYSTEMS AND METHODS FOR IDENTITY GRAPH BASED FRAUD DETECTION

(71) Applicant: Stripe, Inc., San Francisco, CA (US)

(72) Inventors: Ryan Drapeau, Seattle, WA (US); Feiyi Ouyang, Seattle, WA (US); Tianshi Zhu, San Francisco, CA (US); David Abrahams, San Francisco, CA (US); Joshua Rosen, Berkeley, CA (US)

(73) Assignee: Stripe, Inc., San Francisco, CA (US)

( * ) Notice: Subject to any disclaimer, the term of this patent is extended or adjusted under 35 U.S.C. 154(b) by 338 days.

(21) Appl. No.: 16/915,477

(22) Filed: Jun. 29, 2020

(51) Int. Cl.
*G06N 20/00* (2019.01)
*G06Q 20/40* (2012.01)
*G06Q 30/018* (2023.01)
*H04L 67/146* (2022.01)
*G06Q 50/26* (2012.01)
*G06Q 20/34* (2012.01)

(52) U.S. Cl.
CPC ......... *G06Q 20/4016* (2013.01); *G06N 20/00* (2019.01); *G06Q 20/4014* (2013.01); *G06Q 30/0185* (2013.01); *G06Q 20/34* (2013.01); *G06Q 20/4012* (2013.01); *G06Q 50/265* (2013.01); *H04L 67/146* (2013.01)

(58) Field of Classification Search
CPC .............. G06Q 20/34; G06Q 20/4012; G06Q 20/4014; G06Q 20/4016; G06Q 30/0185; G06Q 40/02; G06Q 40/12; G06Q 50/265; G06N 20/00; H04L 67/146
USPC .......................................................... 705/72
See application file for complete search history.

(56) References Cited

U.S. PATENT DOCUMENTS

2020/0126085 A1* 4/2020 Roche .................. G06Q 20/102
2020/0226460 A1* 7/2020 Bruss .................... G06F 16/254

OTHER PUBLICATIONS

Charles Ross, Reducing Payment-Card Fraud, Walden University, Jun. 2020, pp. 42-43, 52, 125 (Year: 2020).*

(Continued)

*Primary Examiner* — Mohammad A. Nilforoush
*Assistant Examiner* — Wodajo Getachew
(74) *Attorney, Agent, or Firm* — Womble Bond Dickinson (US) LLP

(57) ABSTRACT

A method and apparatus for fraud detection during transactions using identity graphs are described. The method may include receiving, at a commerce platform system, a transaction from a user having initial transaction attributes and transaction data. The method may also include determining, by the commerce platform system, an identity associated with the user, wherein the identity is associated with additional transaction attributes not received with the transaction. Furthermore, the method may include accessing, by the commerce platform system, a feature set associated with the initial transaction attributes and the additional transaction attributes, wherein the feature set comprises machine learning (ML) model features for detecting transaction fraud. The method may also include performing, by the commerce platform system, a machine learning model analysis using the feature set and the transaction data to determine a likelihood that the transaction is fraudulent, and performing, by the commerce platforms system, the transaction when the likelihood that the transaction is fraudulent does not satisfy a transaction fraud threshold.

23 Claims, 8 Drawing Sheets

(56) References Cited

OTHER PUBLICATIONS

Liu, S. Cliff and Tarjan, Robert E., "Simple Concurrent Connected Components Algorithms," Mar. 4, 2020.
Galler Bernard A. and Fischer, Michael J., "Disjoint-Set Data Structure," Jun. 22, 2022, https://en.wikipedia.org/wiki/Disjoint-set_data_structure.
Liu, S. Cliff and Tarjan, Robert, "Simple Concurrent Labeling Algorithms for Connected Components," Mar. 3, 2020. https://arxiv.org/abs/1812.06177.
International Preliminary Report and Written Opinion on the Patentability of Application No. PCT/US2021/039235 dated Jan. 12, 2023, 5 pages.

* cited by examiner

SYSTEMS AND METHODS FOR IDENTITY GRAPH BASED FRAUD DETECTION

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf will drive a consumer in their own car, deliver food ordered through a merchant website, pick up and/or drop off clothes dry cleaned by the merchant, etc.

These merchants, although providing systems for supplying products and/or services to consumers, often do not perform the financial processing associated with the merchant transactions. Instead, merchants utilize commerce systems to process financial transactions for the products and/or services provided to consumers. This may include the merchant, agent, and other users establishing accounts with the commerce system. Once the accounts are established, merchants can run financial transactions using the services of the commerce system, merchant agents can accept payments from customers on behalf of the merchant for provided products and/or services, and the commerce system can process the payments, performs payouts for services rendered, as well as other financial processing services. This processing of payments by the commerce platform may include running credit cards, crediting a merchant account for the transaction, crediting the agent responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of a merchant.

To prevent fraudulent transactions, such as when a proffered payment is made with a stolen card number, a card number from an expired card, a spoofed card, etc., the commerce system may perform fraud detection for the transactions. Such fraud detection can include attempting to determine, based on parameters associated with a transaction, whether there is a likelihood that the transaction is fraudulent. For example, whether a card number is associated with past fraudulent transactions, whether the transaction amount or purchase location is a-typical for the card number, what IP address a remote transaction has originated from, etc. Thus, the fraud detection seeks to determine when one or more factors associated with the transaction indicate fraud, such as by employing machine learning techniques to analyze transaction data. However, fraud detection is often limited to the transaction data in front of the commerce platform at the time of the transaction for a given user, such as the user, the card in the transaction, and the transaction parameters. Thus, the fraud detection does not account for relevant factors from other data, such as other cards, past fraud detections, other transactions that are associated with the user, as well as other information. Furthermore, after a card is associated with fraud, it will typically be cancelled and a new card issued to the user. Thus, any collected data for fraud detection purposes that is associated with the prior card and user is lost once the old card is cancelled, and data must be collected and developed for the newly issued card. Such limitations reduce the ability of fraud detection systems to execute fraud detection successfully, and introduce vulnerabilities after fraud is detected (e.g. and a new card without history of data issued after fraud detection). Furthermore, the machine learning techniques used in fraud detection are trained and make fraud detection decisions on a limited data set reducing their potential accuracy, thus limiting their fraud detection capabilities.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
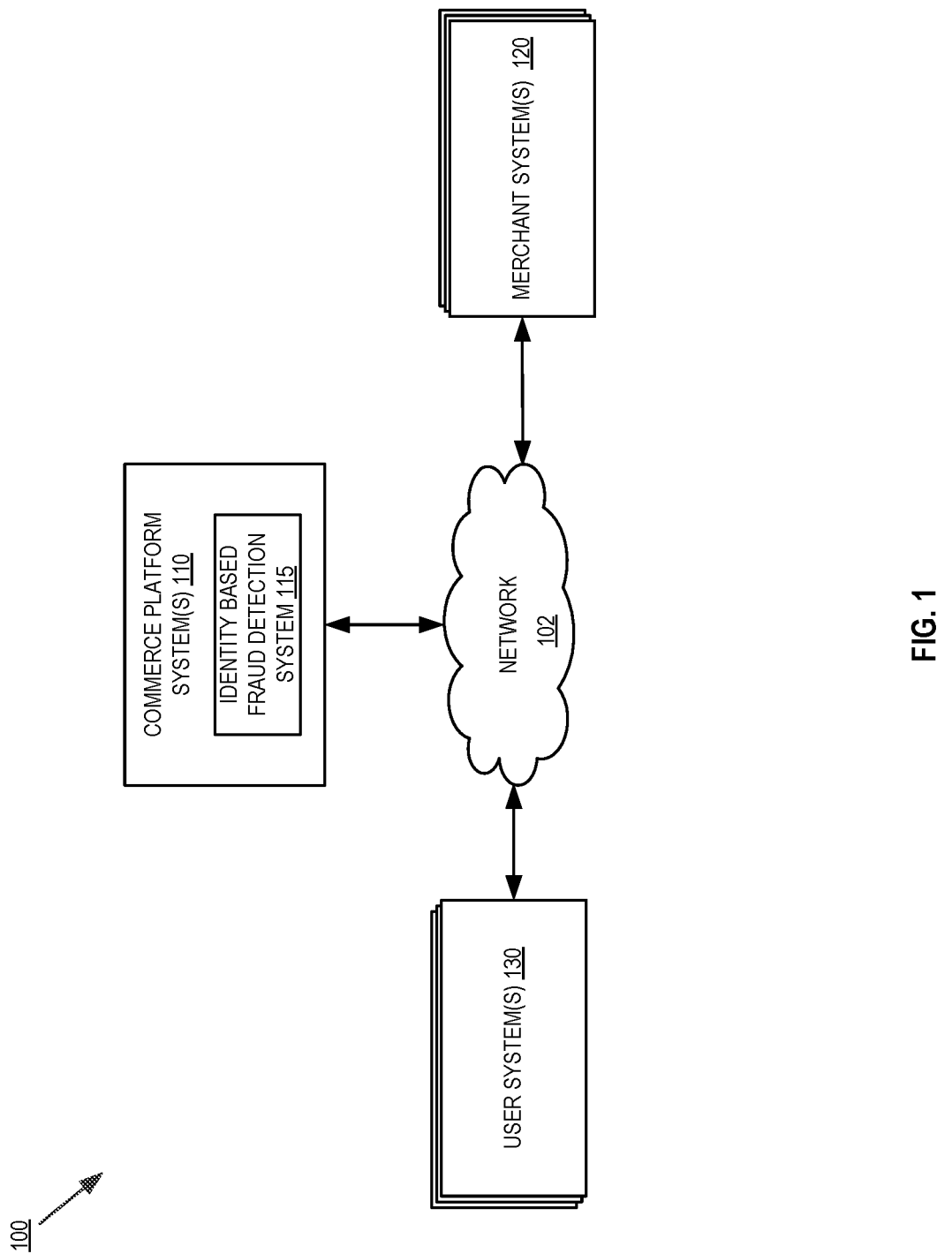
FIG. 1 is a block diagram of an exemplary system architecture for identity-based fraud detection.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "accessing", "performing", "allowing", "generating", "executing", "filtering", "storing", "updating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system 100 architecture for identity-based fraud detection. In one embodiment, the system 100 includes commerce platform system(s) 110, one or more merchant system(s) 120, and one or more user system(s) 130. In one embodiment, one or more systems (e.g., system 120 and 130) may be mobile computing devices, such as a smartphone, tablet computer, smartwatch, etc., as well computer systems, such as a desktop computer system, laptop computer system, server computer systems, etc. The commerce platform system(s) 110 and merchant system(s) 120 may also be one or more computing devices, such as one or more server computer systems, desktop computer systems, etc.

The embodiments discussed herein may be utilized by a plurality of different types of systems, such as other commerce platform system(s) including payment processing systems, card authorization systems, banks, and other systems seeking to identify and detect fraud during transactions. Furthermore, any system seeking to identify fraud during an interaction may use and/or extend the techniques discussed herein to identity based fraud detection. However, to avoid obscuring the embodiments discussed herein, fraud detection during commercial transactions is discussed to illustrate and describe the embodiments of the present invention, and is not intended to limit the application of the techniques described herein to other systems in which fraud detection could be used.

The commerce platform system(s) 110, merchant system(s) 120, and merchant user system(s) 130 may be coupled to a network 102 and communicate with one another using any of the standard protocols for the exchange of information, including secure communication protocols. In one embodiment, one or more of the commerce platform system(s) 110, merchant system(s) 120, and user system(s) 130 may run on one Local Area Network (LAN) and may be incorporated into the same physical or logical system, or different physical or logical systems. Alternatively, the commerce platform system(s) 110, merchant system(s) 120, and merchant system(s) 130 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchants, such as to merchant system(s) 120 and/or merchant user system(s) 130. For example, commerce platform system(s) 110 may manage merchant accounts held at the commerce platform, run financial transactions from user system(s) 130 performed on behalf of a merchant, clear transactions, performing payouts to merchant and/or merchant agents, manage merchant and/or agent accounts held at the commerce platform system(s) 110, as well as other services typically associated with commerce platforms systems such as, for example, STRIPE™.

To prevent fraudulent transactions, in embodiments, commerce platform system(s) 110 utilizes an identity based fraud detection system 115. As will be discussed in greater detail below, the identity based fraud detection system 115 utilizes one or more machine learning models, such as neural network based models, tree based models, support vector machine models, classification based models, regression based models, etc., to analyze attributes associated with a transaction, such as card number used in a transaction, email address used in the transaction, dollar amount of a transaction, etc., as well as fraud detection features generated by the commerce platform for use by the machine learning models when analyzing the transaction, such as a number of transactions on a card used in the transaction, a typical dollar amount of transactions for the card, whether the card number has been used with the email address in a prior transaction, etc. In prior approaches to fraud detection, card number is treated as an identity during a transaction, and features associated with the single card number are analyzed in making a fraud determination.

While such an approach of using a card number as an identity of user may be computationally easy to implement, it does not capture a holistic view of a user's identity and fails to account for a longer historical view of a user, and therefore limits the efficacy of ML based fraud detection systems. That is, users may typically use more than one email address, have more than one card, may have new cards issued (e.g., without a history of transactions) in place of cancelled or expired old cards (e.g., with a history of transactions), perform remote transactions with merchant system(s) 120 using different computers (e.g. have different tracking cookies from such computers associated with different emails, card numbers, IDs, etc.), as well as other factors. For example, card A may be associated with user@email1 and card B may be associated with user@email1. When a transaction is received by commerce platform system 110 using card A, it may be valuable to use information, history, etc. from card B during fraud detection since both cards are associated with the same user.

Accounting for multiple cards, transaction histories, tracking cookies, etc. associated with a user's overall identity, however, is a computationally difficult and time consuming technical problem. Thus, machine learning model based fraud detection typically has not used identity based features when training and using fraud detection models for performing transaction fraud detection. Thus, the embodiments discussed herein provide computationally efficient techniques for generating and updating holistic identities for users of the commerce platform system, and then employing unique identity based features for training and executing fraud detection ML models to improve fraud detection during transactions.

As will be discussed in greater detail below, identity based fraud detection system 115 of commerce platform system(s) 110 generates identities for users from past transaction data, such as past transactions performed by commerce platform system for merchant system(s) 120 and user system(s) 130. The transaction data stores a vast corpus of transaction attribute information (on the order of millions to billions or more of past transactions), such as card numbers used in transactions, email addresses used in transaction, commerce platform user identifiers associated with transactions, tracking cookie identifiers detected during transactions, etc. In embodiments, the identity based fraud detection system 115 employs a combination of serial processing techniques during identity generation, parallel processing techniques during identity updating, and identity based ML feature generation to train and use improved ML fraud detection models that account for identity-based features.

In embodiments, the identity based fraud detection system 115 generates identities from past transaction data. An identity is a holistic view of cards, email addresses, identifiers, computing system cookies, and other information associated with a user. For example, a user may have several credit cards, several email addresses, use different computers each having different cookies downloaded thereon, etc. An identity, as discussed herein, is a collection or cluster of these potentially disparate pieces of information. Therefore, in embodiments, identity based fraud detection system 115 performs an initial identity generation process that analyzes each past transaction to identity transaction attributes (e.g., a card number, user identifier, cookie ID, email address, name on card, IP address, etc.) associated with a user, where a concurrence of any two transaction attributes in a single transaction creates a relationship between the attributes for the user. Identity based fraud detection system 115 represents this relationship as nodes (e.g., the attributes) joined by an edge (e.g., the concurrence of the two attributes in a transaction, or other records maintained or accessible to the commerce platform system from which the concurrence of two attributes can be detected). By processing each transaction from a history of transactions stored by the commerce platform system(s) 110 to extract related transaction attributes, the identity based fraud detection system 115 generates a large quantity (e.g., on the order of billions) of nodes and edges for a plurality of users of the commerce platform system(s) 110. For example, as illustrated by processing operation 480 in FIG. 4B, where the processing operations may be performed by one or more computer processors, transactions from a transaction data store 204 are transformed into a set 490 of nodes pairs (e.g., transaction attributes) joined by an edge indicating the relationship between the nodes (e.g., concurrence during a transaction).

In embodiments, additional nodes and edges may be formed using other or additional sources, for example, by receiving data (e.g., user browser data, such as cookies, collected by merchants and associated with card numbers, names, or other transaction data), by accessing user account data maintained by the commerce platform system 110 (e.g., such as card numbers associated with other user data in a user account data store), as well as other sources for forming node pairs joined by an edge.

With such a large data set, several technical problems are created, a first data skew occurs in the unpredictable variability in identity graph sizes, or cluster sizes, that are generated from the vast number of pairs of nodes joined by edges in the generated set 290, which may be on the order of billions of node pairs joined by edges. Processing such a large set into identities is computationally difficult given the scale involved where clusters/identities are potentially extremely large (e.g., a single card associated with hundreds or more other nodes), clusters/identities may be formed resulting in a large chain of nodes (e.g., A→BC→ and so on), as well as other large identities. Such unpredictability makes it difficult to process nodes/identities using distributed computing techniques. For example, in distributed computing, the number of nodes associated with an identity/cluster may be large, potentially overloading a processor/worker responsible for processing the cluster, thus stopping the processing of other clusters, and potentially stopping all identity/cluster processing thereby stopping the whole job. Therefore, in embodiments, identity based fraud detection system 115 employs an efficient serial processing technique 482, such as connected components processing technique, to generate clusters by joining related nodes/edges. In embodiments, a stream of edges and vertices is processed using a disjoint set technique that as a node pair is processed by the connected components technique, it is removed from the set 490. The streaming of edges and execution of connected components is a computationally efficient approach to handling the first data skew problem noted above. Furthermore, the result of the processing 482 is a plurality of identity graphs or clusters, such as identity graph 492 that represents identity$_i$.

In embodiments, a second data skew can then be resolved by filtering out the large identities/clusters formed during the serial processing phase. For example, an identity$_k$, may include hundreds or more nodes potentially representing a bad or false identity, or at the very least an unworkable identity based on cluster size. For example, card scammers may run test transactions on a large number of stolen cards, therefore creating large identities. In embodiments, identity based fraud detection system 115 may therefore filter out large identities, for example those over a threshold size of nodes (e.g., 50, 100, 200, etc.) to handle the second data skew problem. Once filtering is performed, an efficient parallel processing technique may then be applied when processing the identity graphs, as discussed in greater detail herein, since the large and problematic identities have been removed.

Furthermore, in embodiments, the identity based fraud detection system 115 may further periodically update the identities, for example on an hourly, daily, weekly, monthly, etc. basis to find new identities as well as to augment existing entities. In embodiments, the identity based fraud detection system 115 performs the streaming approach with connected components analysis to generate a new set of node pairs joined by edges. However, since the set of transactions is for the update period (e.g., week, day, hour, etc.), the first data skew issue noted above is of little impact because the connectivity skew has been filtered out after the disjoint set algorithm was used. Then, in embodiments, the new set is processed by the identity based fraud detection system 115 using a distributed processing technique, such as distributed label propagation, which is a technique for joining unlabeled nodes/edges to identities (e.g., clusters of nodes/edges forming an identity). By using a distributed approach, the label propagation analysis may update the existing entities in a computationally efficient manner. Furthermore, since label propagation is a distributed approach, the distribution to multiple machines (e.g., multiple commerce platform system computer systems, data center computer systems, etc.) further speeds up the efficiency of processing the updates to the existing and new identities.

In embodiments, identity based fraud detection system 115 uses the identities to generate and train ML fraud detection models with identity based features for use during transaction based fraud detection. In embodiments, ML fraud detection models, for example tree based models, regression based models, neural network based models, etc., take as input a set of features (e.g., number of transactions on a card, number of detected fraud, whether an IP address has been seen before, amount of a transaction relative to prior transaction amounts, etc.), and make a fraud based determination from the set of features. Furthermore, ML model training may be performed prior to the ML model use and/or periodically using sets of features and corresponding known fraud detection results. Thus, as discussed above, identity based fraud detection system 115 leverages the generated identities to generate new ML model features from which the ML models may be trained and used during transactions. For example, features such as a number of countries for which an identity has cards in (e.g., US card, EU cards, JP cards, etc.), how many transactions total is an identity associated with, whether conflicts are detected between identity attributes, how many total prior fraudulent transactions were detected for an identity, etc. Such identity based features are not obtainable from prior approaches that treated card number as a user's identity. Furthermore, such features provide valuable fraud detection insights that were previously not used or available. As a result, the ML models generated for fraud detection, and the resulting fraud detection performed during transactions, is improved to be more accurate and robust against fraud attempts.

In embodiments, identity based fraud detection system 115 may generate ML model training data by using prior transaction fraud detection results and identity based features (e.g., number of countries for cards of a user, number of cards across an identity, prior fraud detection total, etc.). In embodiments, the identity based features are generated by identity based fraud detection system 115 by scanning each identity graph, or accessing the nodes form each identity graph, and calculating the various features from the nodes and data associated with the nodes (e.g., by accessing a transaction data store maintained by the commerce platform system(s) 110). Furthermore, a fraud detection result may be attributed from actual prior transactions. The identity based features may then be fed into a ML model training/retraining system so that the ML models may use identity based feature during a transaction. In embodiments, it should be noted that the ML models may use a combination of identity based features with traditional fraud detection features to further augment, refine, and/or update existing trained ML models.

In embodiments, identity based fraud detection system 115 may then employ the improved models during transactions to take advantage of the improved fraud detection techniques. For example, a transaction may be received from a user system 130, via merchant system 120, where the transaction has certain attributes (e.g. card number, email address, IP address, tracking cookie, etc.). One or more transaction attributes, such as card number, may be used to identify the associated identity for the transaction. Then, once identified, the identity based fraud detection features, as well as traditional fraud detection features, may be generated by the identity based fraud detection system 115. The fraud detection features with the transaction parameters may then be fed into one or more ML fraud detection models to determine a likelihood of fraud associated with the current transaction. If the ML models indicate that a fraud detection threshold is satisfied (e.g., a transaction is likely associated with fraud), the transaction may be rejected. Thus, the use of ML models trained with identity features improves fraud detection during transactions.

In embodiments, systems in addition to real time transaction systems may use the identity based ML fraud detection discussed herein. For example, systems may pre-judge transactions for potential fraud (e.g., analyzing a requested fare by a ride sharing service, analyzing a remote computing job where payment is to be received at a later date, etc.) so that likely fraudulent transactions can be avoided before liability is incurred. In any of the embodiments, the identity based feature generation and ML model analysis improves fraud detection to improve the underlying fraud detection systems.

Figure 2:
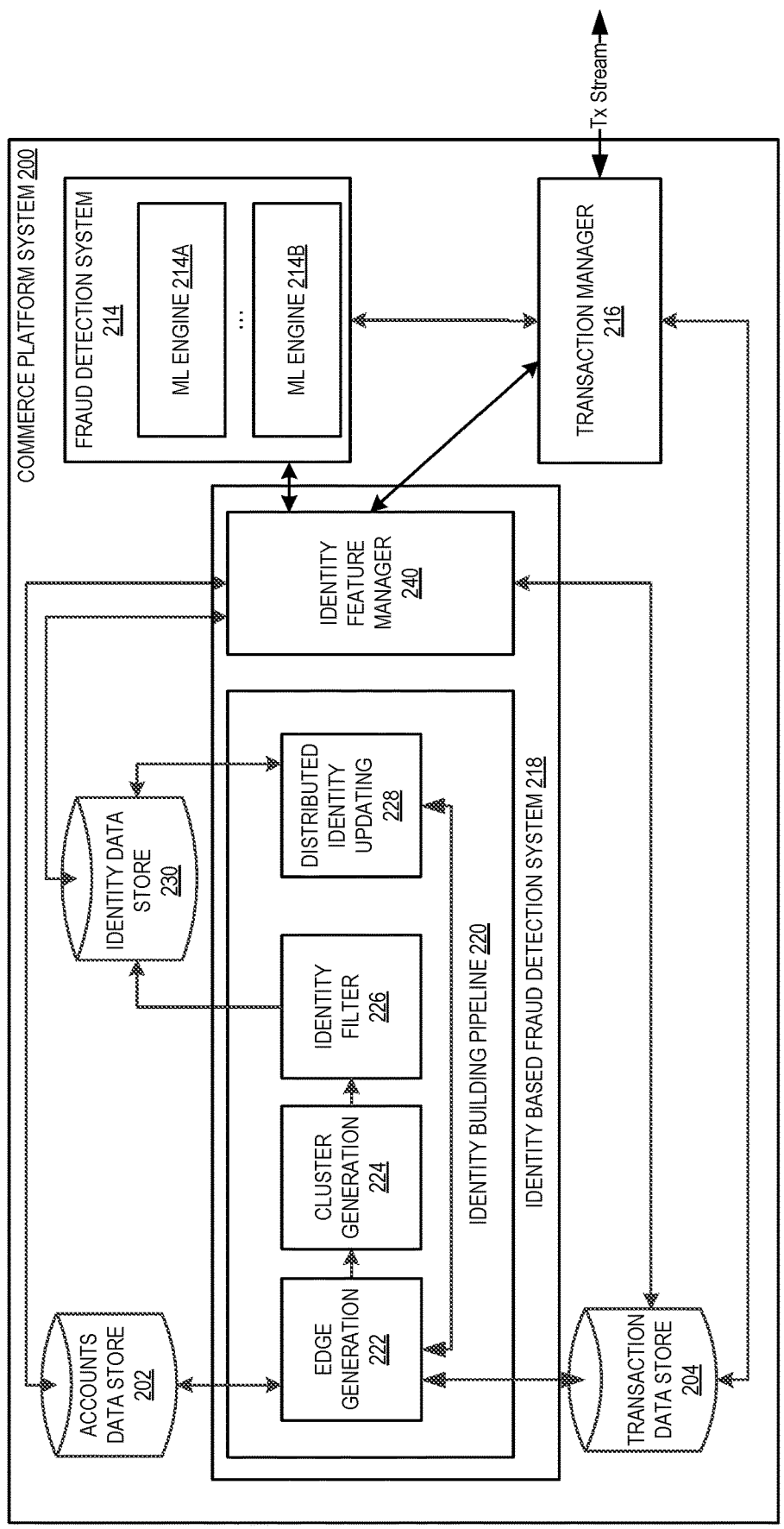
FIG. 2 is a block diagram of one embodiment of a commerce platform system providing identity based fraud detection.

FIG. 2 is a block diagram of one embodiment of a commerce platform system 200 providing identity based fraud detection. Commerce platform 200 provides additional details for the commerce platform system(s) 110 discussed above in FIG. 1.

In one embodiment, commerce platform 200 includes an accounts data store 202, a transaction data store 204, and an identity data store 230. The commerce platform system 200 further includes an identity based fraud detection system 218 (e.g., system 115) with an identity building pipeline 220 and an identity feature manager 240 communicatively coupled with the data stores (e.g. stores 202, 204, and 230). As discussed herein, the identity based fraud detection system 218 may employ the identity building pipeline 220 and identity feature manager 240 to generate identities, update identities, generate identity based features for training/retraining ML models (e.g. models 214A through 214B) of a fraud detection system 214, and generate or access identity based features for transactions received by a transaction manager 216.

Identity based fraud detection system 218 uses the identity building pipeline 220 to generate identities. The pipeline includes edge generation 222, cluster generation 224, identity filter 226, and distribute identity updating 228.

In an embodiment, identity building pipeline 220 generates an initial set of identity subgraphs with edge generation 222 accessing past transaction data store 204, and optionally other sources, such as accounts data store 202, receiving data from merchant systems, etc. Past transaction data store 204 stores a plurality of transactions, the attributes of each transaction, a fraud detection associated with each transaction, etc. Furthermore, for users and/or merchants with a commerce platform account, additional transaction information, such as user identifiers, associated cards, known IP addresses, distributed tracking cookie identifiers, etc. may be obtained from accounts data store 202. Edge generation 222 sequentially processes each transaction to generate a plurality of identity subgraphs including an edge between transaction attributes. For example, attributes such as card number, user ID, name on card, PIN number for a card, email address, etc., may be transaction attributes (e.g., nodes). Then edge generation 222 will join attributes (e.g., nodes) with an edge indicating a relationship between the attributes, when there is a concurrence of the attributes in a single transaction. Edge generation 222 generates a large set of nodes and edges (e.g. on the magnitude of billions) from the corpus of past transaction data maintained by the commerce platform system 200.

Cluster generation 224 accesses the set of nodes and edges. Due to the large size of node/edge pairs, which at this point in the pipeline are not necessarily ordered, cluster generation 224 is configured to execute a connected components analysis on the edges of the graphs in the set to form clusters. In embodiments, connected components is a labeling technique that efficiently processes the large set of graphs where subsets/clusters are formed by joining subgraphs sharing an attribute. For example, as illustrated in FIG. 4B, the graph illustrating identity$_i$ 492, has joined user ID with card nu. 1 and cookie ID to form a larger cluster since the illustrated node —edge—node graphs in the set 290 include nodes/edge corresponding to user ID—card nu. 1 and card nu. 1—cookie ID. In one embodiment, cluster generation 224 ingests a stream of edges and vertices for serial processing and cluster generation, and eliminates nodes/edge from the set once processed using a disjoint set technique. That is, cluster generation 224, in embodiments, processes the set of node/edge subgraphs one edge at a time until all node/edge subgraphs have been processed. As discussed herein, even though the set of past transaction data upon initial identity generation is large, the serial connected components analysis with the disjoint set elimination of processed node/edge pairs efficiently processes the data set to generate clusters, which as discussed herein are identity graphs forming identities of the users of the commerce platform system 200.

Identity filter 226 may then filter out identities over a predetermined size limit determined based on a number of nodes in an identity graph. For example, by filtering out identities over 100 nodes, 98% of identities are retained. Furthermore, the filtered out 2% are likely due to problematic identities (e.g. identities associated with scammers using card testing techniques, as well as other nefarious uses). Any number of nodes may be used for filtering purposes. Identity filter 226 may then store the remaining identities, with an ID, in identity data store 230.

In embodiments, identity building pipeline 220 may then periodically (e.g., hourly, daily, weekly, monthly) update the identities with transaction data from the past period of time. The identity building pipeline 220 consumes transaction data and edges between attributes as discussed above using edge generation 220. However, during updating, the generated set of nodes joined by edges (e.g., identity subgraphs) is then processed by distributed identity updating 228. Because the updated set of transaction nodes and edges for the period of time is of a more manageable size (e.g., on the scale of hundreds of thousands to millions and not billions of nodes/edge subgraphs), distributed identity updating 228 uses distributed label propagation to assign the new edges to existing identities in identity data store 230, where joining can occur (e.g. concurrence of attributes), or form a new identity with ID (e.g., where attributes have no existing concurrence). In embodiments, label propagation takes the previous state of the identity graphs, and adds new connections/relationships where appropriate based on subgraphs for an update period. Furthermore, the processing of subcomponents and updating of existing identities enables distributed identity updating to be performed in a distributed manner, where updates are assigned to different processors, machines, etc. for performance in parallel to increase the efficiency and reduce compute time used to update the identities. For example, as illustrated in FIG. 4B, cookie ID 2 is connected to User ID 2 via dashed line for the identity graph 492 to illustrate the update (via label propagation) the new node (e.g. cookie id 2) added to identity 492. The updated identity graph(s) are stored in identity data store 230.

In embodiments, the identity based fraud detection system 218 further includes the identity feature manager 240 to generate identity based features for training ML models used by ML engines 214A and 214B, as well as to generate or access identity based features during a transaction received by transaction manager 216 (e.g., via a transaction stream) for making a ML engine based fraud prediction for a transaction.

In embodiments, fraud detection engine 214 includes one or more machine learning analysis engines, such as ML engines 214A and 214B, utilized in determining whether a current or future transaction is fraudulent. When a likely fraudulent transaction is detected, based on a set of user features, the transaction may be cancelled to prevent loss due to the transaction. In certain aspects, the ML engine(s) 214A and 214B implement at least one machine learning model selected from the following non-limiting examples: Random Forest, Classification and Regression Tree, boosted tree, neural network, support vector machine, general chi-squared automatic interaction detector model, interactive tree, multi-adaptive regression spline, and naïve Bayes classifier. In one embodiment, the models of ML engines 214A and 214B are an XGBoost tree-based model and a deep neural network model, however, other models or combination of models may be used. In the embodiments, the ML engines 214A and 214B can be used to determine, for a given transaction and features determined for an identity, the likelihood that the transaction is fraudulent based at least in part on a prediction of the probability or likelihood of the feature set associated with the identity indicating fraudulent activity. This likelihood can be mapped to a standard scale (e.g., between 0.0 and 1.0), or other value, from which a determination of likelihood of fraud may be predicted.

To determine the probability or likelihood that a transaction associated with an identity is fraudulent, the ML engines 214A and 214B may create or utilize one or more models. In an embodiment, models can be constructed, trained, and refined to use feature sets associated with users and/or identities. In embodiments, the features may be associated with specific user identifiers, such as transaction totals for a specific payment card of a user, total fraudulent transactions for that card, etc. Furthermore, as discussed herein, an identity can be used by identity feature manager 240 to generate additional features to train ML models and make fraud determinations using ML engines 214A and 214B. For example, identity based features generated by identity feature manager 240 can include more holistic features, such as total transactions for an identity (e.g., across all cards associated with the identity), total fraud detections for the identity, total number of cards for an identity, whether multiple users are associated with an identity, how many countries an identity has cards in, how many banks an identity is associated with, how many disputes an identity has been associated with, how many financial reviews an identity is associated with, whether there is conflicting information found for an identity (e.g., different emails, names, etc. used with a card), as well as other features that may be determined for an identity.

In embodiments, the models used by ML engine(s) 214A and 214B can at least partially be created offline using features extracted from identities, as well as traditional user-based features, and transaction records associated with prior fraud detection. In embodiments, ML engine(s) 214A and 214B can be trained using training data based on various user and identity based features, and may further be refined over time based future transactions for which no fraud was detected and no fraud existed, no fraud was detected but fraud did exists, fraud was detected and no fraud existed, fraud was detected and fraud did exist. In embodiments, such training data may be gathered from a transaction data store and identity feature data. In embodiments, one or more ML training techniques appropriate for a given model may be executed by ML engine(s) 214A and 214B periodically as new/additional training data becomes available, as well as in real-time using, for example, session data and transaction data as transactions occur.

The specific models used for a predicting the likelihood of fraud using user feature data and identity feature data may vary based on factors such as whether a user has been uniquely identified (e.g., using identifying detail like customer email, phone number, user id (UID)), the extent to which information about the user can be automatically collected (e.g., using cookies, client-side libraries), the extent to which the user has a transaction history, and other factors. Models can be constructed for varying levels of specificity, including at the individual user/identity level, cohort level in which users sharing similar characteristics are grouped, merchant level, and merchant cohort level in which users sharing similar characteristics are grouped. Each of these models can be created using multiple features, including features drawn identities.

In some embodiments, a Random Forest technique, such as XGBoost may be used in determining whether a transaction is likely to be fraudulent based on user and identity based features. Random forests can be an ensemble learning method for classification, regression and other tasks, that operate by constructing a multitude of decision trees at training time and outputting the class that is the mode of the classes (e.g. classification) or mean prediction (e.g. regression) of the individual trees. As an ensemble method, Random Forest can combine one or more 'weak' machine-learning methods together. Random Forest can be used in supervised learning (e.g. classification and regression), as well as unsupervised learning (e.g. clustering). The random forest approach may be used in binary classification mode in which the probability of that given transaction is fraudulent based on a feature set is mapped to between 0 and 1. Using Random Forest, three phases of model construction and evaluation can be employed: testing, training, and prediction. By way of example, a testing phase may be employed in which historical data about feature sets, such as all transactions completed in 2019, is used to make a model. Once validated, the models may be used in prediction, to predict on new or live features during transactions the probability or likelihood of a fraudulent transaction.

In embodiment, ensemble methods may also be provided in embodiments, such as combining ML analysis performed by ML engines 214A and 214B. In statistics and machine learning, ensemble methods can use multiple ML model analysis techniques to obtain better predictive performance than could be obtained from any of the constituent learning algorithms. In an example, two models are generated and combined to create one prediction, with one model using the XGBoost technique and one model using a deep neural network (DNN) technique. However, other and additional models may be used including, but not limited to, regular random forest, one balanced random forest, support vector machine, etc. Each is trained to predict the probability or likelihood of a given transaction being fraudulent using user features, such as traditional user features and those from identities, as discussed herein. five models can then be ensemble together to deliver a single result that can have more power to detect fraudulent transactions, and provide a better prediction accuracy than any one model individually. In some embodiments, the predictions of the models may be weighted, combined using conditional probabilities on permutations, using a purely Bayesian methodology, and/or using cross-validation, etc.

After training of the models used by ML engines 214A through 214B, transaction manager may employ fraud detection system 214 during transactions to use the ML engines 214A through 214B to predict whether an incoming transaction is likely fraudulent. In embodiments, transaction manager 216 may pass certain transaction attributes (e.g., card number, name on card, email used in a transaction, etc.) to fraud detection engine 214 or identity feature manager 240. Then, identity feature manager 240 (whether receiving the transaction attributes directly from transaction manager 216 or forwarded from fraud detection system) may generate or access identity based features for an identity matching the transaction attributes. For example, based on a card number in a transaction, identity feature manager may match the transaction with the identity having the card number in its identity graph in identity data store 230. In one embodiment, identity data store may be populated with identity features per identity (e.g., as pregenerated by identity feature manager), or identity feature manager may use an identity graph to calculate identity based features on the fly. In either embodiment, the identity graph includes holistic user information, such as cards associated with a user's identity, card numbers, tracking cookie IDs, customer IDs, etc. Then, these pieces of information may be used by identity feature manager to compute identity based features, such as total number of cards for an identity, total fraudulent transactions for an identity, total number of countries for which the identity has a card in, as well as other identity based features. ML engine(s) 214A through 214B are provided with the identity based features, as well as any other more traditional features, along with the transaction attributes for the given transaction. ML engine(s) 214A through 214B either individually or collectively make a fraud determination for the transaction, which is provided to transaction manager 216 to either accept or reject the transaction.

Thus, as discussed herein, the feature set for which ML engines 214A through 214B are trained and used is improved so that fraud detection system 214 can make more accurate fraud predictions. This improves both the training and usage of the ML models by the ML engines 214A through 214B, and thus the transaction processing performed by commerce platform system 200. Furthermore, the identity based fraud detection system 218 uses both serial and parallel processing of transactions, at different stages of identity generation and updating, to handle various data and processing challenges discussed herein.

Figure 3:
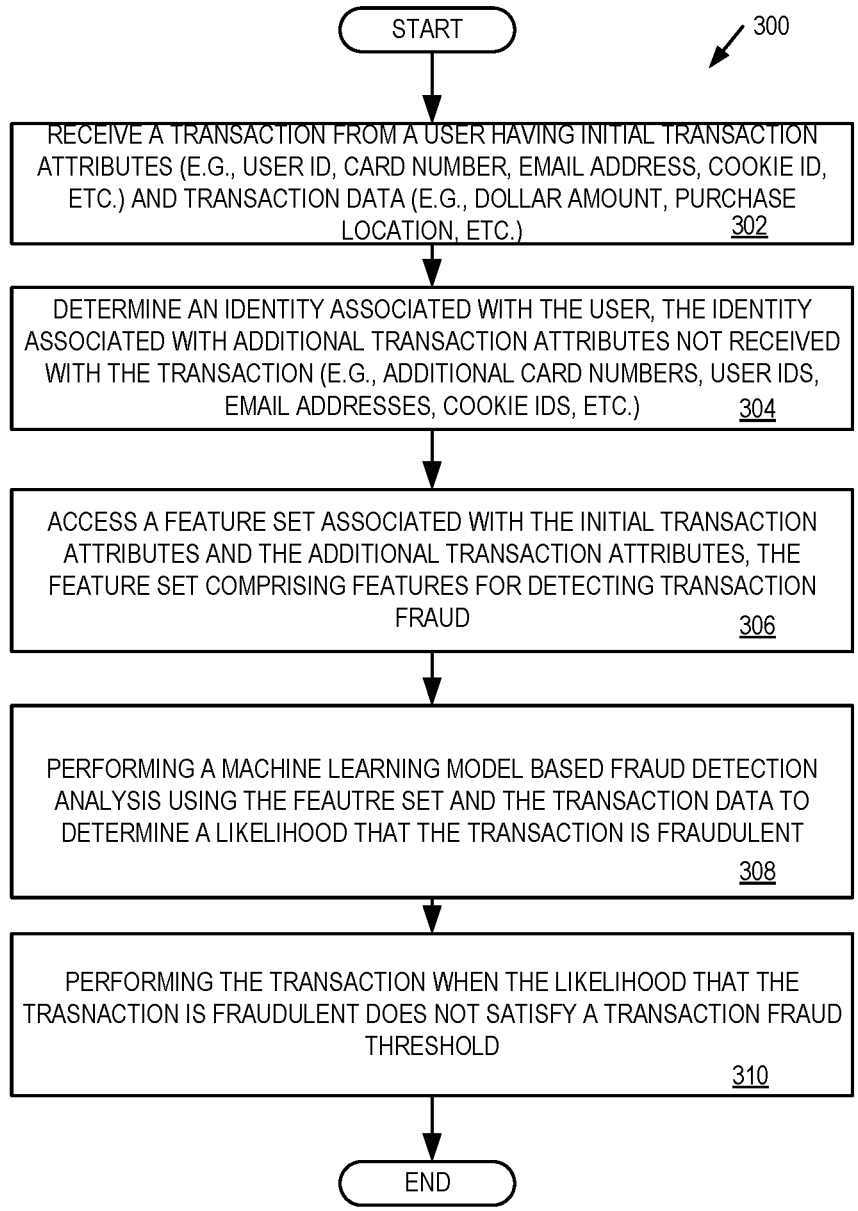
FIG. 3 is a flow diagram of one embodiment of a method for performing identity based fraud detection.

FIG. 3 is a flow diagram of one embodiment of a method for performing identity based fraud detection. The method 300 is performed by processing logic that may comprise hardware (circuitry, dedicated logic, etc.), software (such as is run on a general purpose computer system or a dedicated machine), firmware, or a combination. In one embodiment, the method 300 is performed by a commerce platform system (e.g., commerce platform system 110 or commerce platform system 200).

Referring to FIG. 3, processing logic begins by receiving a transaction from a user having initial transaction attributes (e.g., a user identifier, a card number, an email address, a tracking cookie ID, etc.) (processing block 302). In embodiments, the transaction is a commercial transaction in which a commerce platform is used to run, clear, etc. a transaction, for example, on behalf of a merchant.

Processing logic determines an identity associated with the user, the identity associated with additional transaction attributes not received with the transaction (e.g. additional card numbers, user IDs, email addresses, tracking cookie IDs, etc.) (processing block 304). In embodiments, processing logic may use one or more pieces of the initial transaction attribute data (e.g., that received with the transaction) to locate an identity graph having that same attribute data, where the identity graph includes nodes with the additional transaction data.

Processing logic accesses a feature set associated with the initial transaction attributes and the additional transaction attributes, the feature set comprising features for detecting transaction fraud (processing block 306). In embodiments, the feature set may include features such as transaction total, card number, transactions associated with the card, etc., as well as identity based features, such as total number of cards, total number of countries, total number of past fraudulent transactions (even for cancelled/replaced cards), total number of banks a user banks with, total countries which an identity has cards issued in, etc. The feature set with the additional transaction data therefore provides an enhanced feature set with fraud detection features gleaned from an identity, and which assist in improving the accuracy with which transaction fraud is detected. Furthermore, in embodiments, accessing the feature set can include generating the feature set based on an identity graph (e.g., generating counts from attributes in an identity graph based on transaction data and/or third party data), accessing a pregenerated feature set, or a combination.

Processing logic performs a machine learning model analysis of the feature set and the transaction data to determine a likelihood that the transaction is fraudulent (processing block 308). In embodiments, the parameters and attributes of the transaction and the feature set may be input into one or more trained ML models. Each ML model may then make a fraud determination, such as a likelihood % or score that the transaction is fraudulent. Furthermore, if more than one ML model is used, the determination of each model may be combined in an ensemble technique. Processing logic then performs the transaction when the likelihood that that transaction is fraudulent does not satisfy a fraud threshold (processing block 310). In embodiments, performing the transaction can include clearing the transaction with a credit card company or bank, notifying a merchant of a successful payment, crediting an agent of the merchant, etc.

Figure 4A:
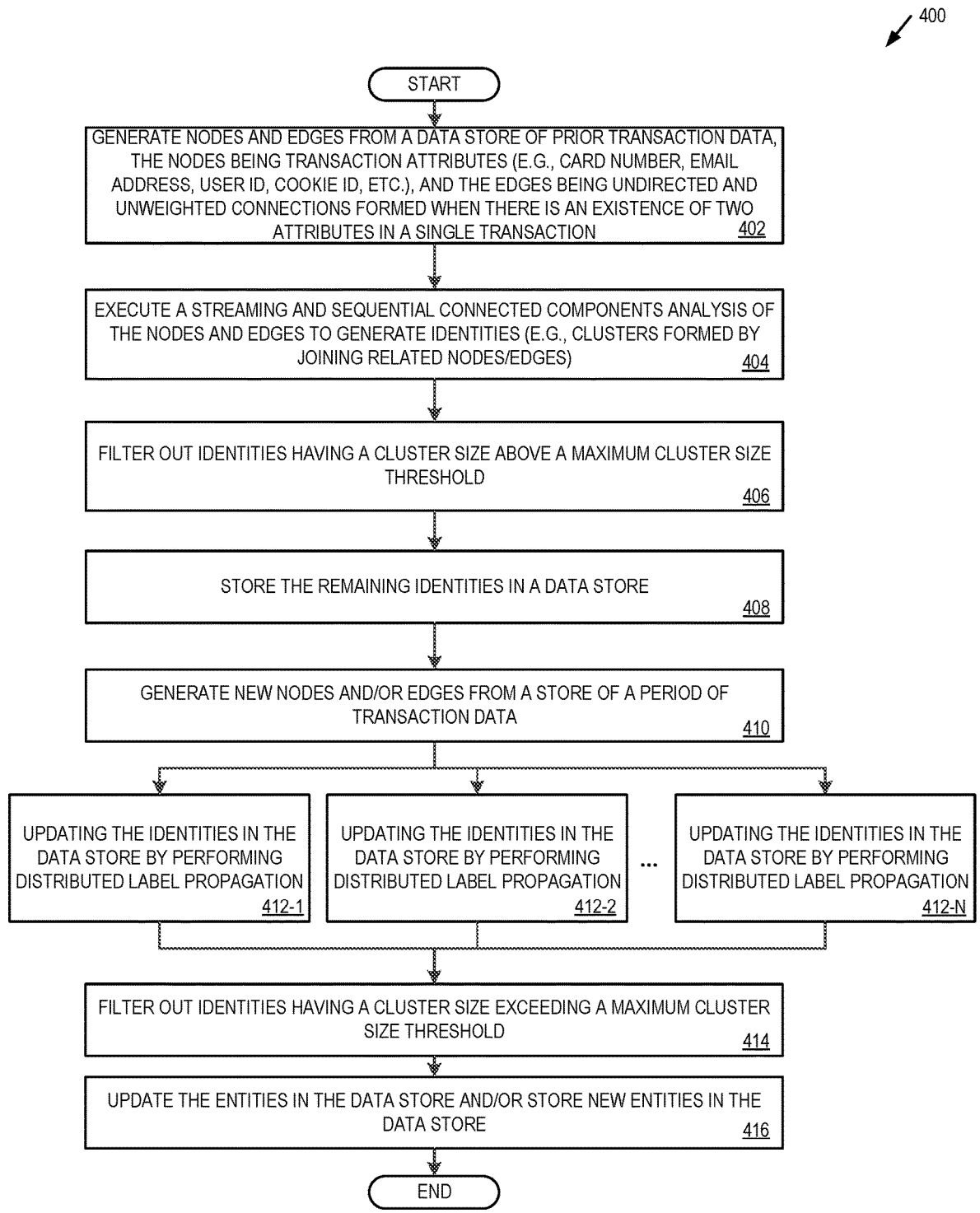
FIG. 4A is a flow diagram of one embodiment of a method for performing serial and parallel processing when generating and updating identities used for machine learning (ML) feature generation and identity based ML fraud detection.
Figure 4B:
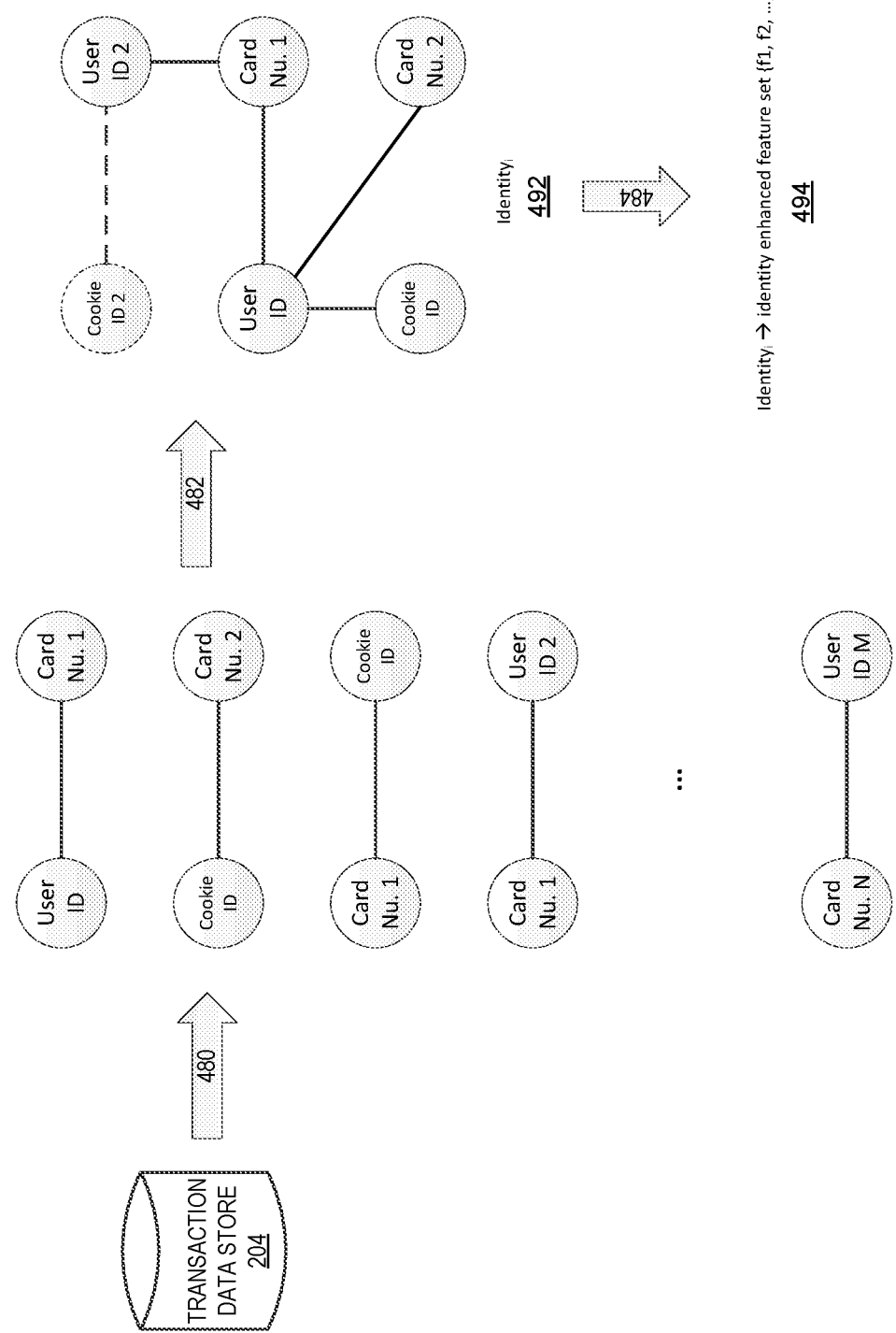
FIG. 4B is a block diagram of one embodiment of a method for performing identity generation.

FIG. 4A is a flow diagram of one embodiment of a method for performing serial and parallel processing when generating and updating identities used for machine learning (ML) feature generation and identity based ML fraud detection. The method 400 is performed by processing logic that may comprise hardware (circuitry, dedicated logic, etc.), software (such as is run on a general purpose computer system or a dedicated machine), firmware, or a combination. In one embodiment, the method 400 is performed by an identity based fraud detection system of a commerce platform system (e.g., identity based fraud detection system 115 or 218 of a commerce platform system 110 or 200).

Referring to FIG. 4, processing logic begins by generating nodes and edges from a data store of prior transaction data, the nodes being transaction attributes (e.g., card number, email address, user ID, cookie ID, etc.), and the edges being undirected and unweighted connections formed when there is an existence of two attributes in a single transaction (processing block 402). For example, as illustrated in FIG. 4B, the set 490 of nodes subgraphs each having two nodes joined by an edge are formed by processing past transactions from the transaction data store 204, as discussed herein. Furthermore, the nodes are joined by an edge that identifies their concurrence in a transaction. Since concurrence defines the relationship between nodes, the edge need not be directed or weighted. However, in some embodiments, edges may be weighted to enhance an understanding of the underlying relationship between certain nodes in an identity graph and/or to enhance feature generation for fraud detection. For example, Card A may be linked to Email B, and Card A may also be linked to Email C, as detected through concurrences detected in transactions discussed above. However, Card A may be linked to Email B by over 1000 transactions, whereas Card A may be linked to Email C by 5 transactions. In embodiments, such a difference in concurrences may be represented by a weighting of the edges between Card A and Email B, as well as between Card A and Email C, such by weighting Card A's relationships as a number of concurrences detected, relative relationship, percentage, etc. In some embodiments, relationships like Card A—Email C may also be filtered from a identity, such as when it has less than a threshold number of transactions, when the relationship weightings are mismatched by a certain degree, etc. In embodiments, such edge weighting may be used by processing logic to, for example, signal to a ML model that the relationship between Card A and Email B is more likely to be accurate than the relationship between Card A and Email C. Then, during ML feature generation and/or ML model training, as discussed herein, the magnitude of relationships as determined through edge weighting can be used to weight features (e.g., fraud was detected twice in the 1000+ transactions in the Card A—Email B relationship, whereas fraud was detected 5 times in the 5 transactions in the Card A—Email C relationship, thereby indicating that on average, a transaction using Email B is less likely to be associated with fraud).

Processing logic then executes a streaming and sequential connected components analysis of the nodes and edges to generate identities (e.g., clusters formed by joining related nodes/edges) (processing block 404). In embodiments, connected components analysis scales to a large number of nodes/edges, and thus consumes the generated set of nodes/edges one edge at a time when forming clusters (e.g., by joining related nodes/edges). Processing logic may then filter out identities having a cluster size above a maximum cluster size threshold (processing block 406). In embodiments, the threshold is configured to retain a majority of the clusters/identities, but filter out identities likely to be associated with improper identities, such as card number thieves. The remaining identities are stored in a data store (processing block 408). As discussed herein, each identity represents a holistic view of a user for future transaction fraud detection, as well as for training fraud detection ML models.

After the identities are built, processing logic may periodically update the identities (e.g. augment existing identities based on new transaction and/or create new identity graphs). Thus, processing logic generates new nodes and/or edges from a store of a period of transaction data (processing block 410), such as a day, week, month, etc. of transaction data. Because there are far fewer generated node/edge subgraphs generated at processing block 410 (e.g. generated for an update period) when compared to processing block 402 (e.g., generated for all prior transactions), processing logic utilizes a different technique and processing method to update the identity graphs in the data store. In embodiments, processing logic updates the identities in the data store by performing distributed label propagation (processing blocks 412-1, 412-2, through 412-N). That is, node/edge subgraphs may be processed in parallel to update (e.g., propagate) the subgraphs to existing identities and/or to new identities where none previously existed. Label propagation is a technique for updating the structures of the existing identities that lends itself to distributed computing. Furthermore, the distributed computing further enhances the efficiency and reduces the time consumed when performing identity graph updating.

Processing logic may then again perform filtering for identities having a cluster size that exceeds a maximum cluster size threshold (processing block 414), and the data store is updated accordingly with the new/updated identities (processing block 416).

Figure 5:
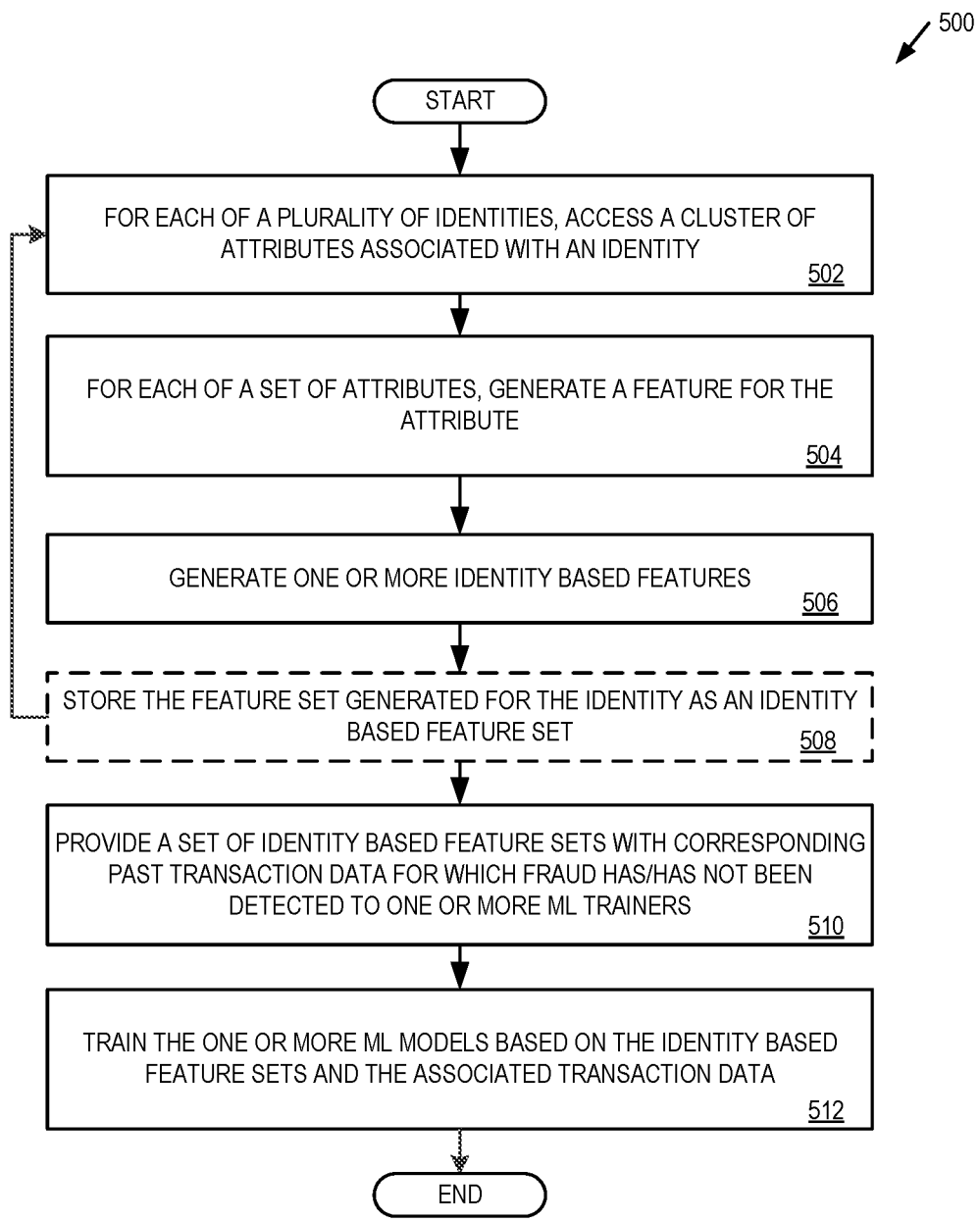
FIG. 5 is a flow diagram of one embodiment of a method for identity based feature generation and training of ML fraud detection models.

FIG. 5 is a flow diagram of one embodiment of a method 500 for identity based feature generation and training of ML fraud detection models. The method 500 is performed by processing logic that may comprise hardware (circuitry, dedicated logic, etc.), software (such as is run on a general purpose computer system or a dedicated machine), firmware, or a combination. In one embodiment, the method 500 is performed by a commerce platform system (e.g., commerce platform 110 and/or 200).

Referring to FIG. 5, processing logic begins by for each of a plurality of identities, access a cluster of attributes associated with an identity (processing block 502), such as accessing an identity graph as generated in the above discussion.

Then, for each of a set of attributes, generate a feature for the attribute (processing block 504). In one embodiment, the feature may be a count associated with the attribute (e.g., total transactions for a card, dollar amount for transactions for a card, etc.). The feature may also be data other than a count (e.g. card number is no longer valid). Furthermore, where edges in identity graphs include weighting, such weightings may be accounted for during feature generation, such as increasing feature importance or decreasing feature importance based on edge weighting, based on relative weightings between similar features, by filtering out features when edge weightings do not satisfy minimum threshold(s), etc.

Processing logic further generates one or more identity based features (processing block 506). As discussed herein, identity based features are holistic, and are generated across attributes of a user's identity. For example, an identity graph for a user may be associated with several cards (e.g. current cards, and previously cancelled cards), several email addresses, several tracking cookies (e.g., those distributed to different devices), etc. Thus, the identity based features may be those that reflect features across an identity, such as total transactions across all cards, total fraud detections for an identity, total number of countries for which a user has cards in, total number of banks affiliated with the cards, etc. As discussed above, these identity based features may be generated by consulting past transaction records and/or third party systems based on the identity graph attributes, and may also account for edge weightings extracted from identity graphs Processing logic stores the feature set(s) generated for the identity as an identity based feature set (processing block 508). Processing logic then returns to processing block 502 to generate a feature set for another cluster or identity graph.

The feature set may be provided with corresponding past transaction data for which fraud has/has not been detected to one or more ML trainers (processing block 510). That is, the feature sets, transaction data, and fraud determinations form training/retraining data from which ML models (e.g. tree-based, neural network based, regression based, etc.) can be trained to detect fraud using identity based features. Processing logic then trains the one or more ML models based on the identity based feature sets and the associated transaction data (processing block 512).

In embodiments, processing block 502-512 are re-performed periodically to retrain and refine fraud detection ML models as new training data becomes available, new identity based features are used, or a combination.

Figure 6:
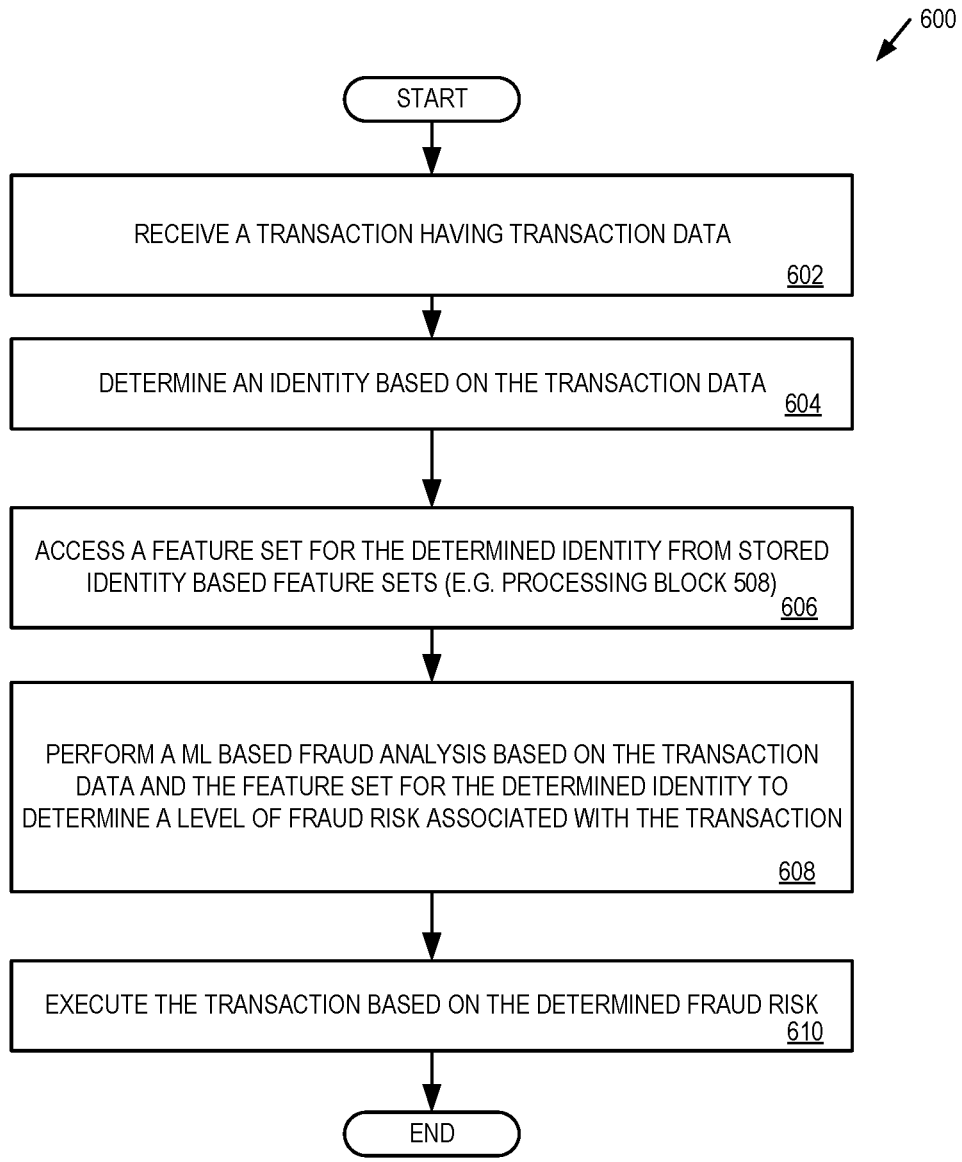
FIG. 6 is a flow diagram of one embodiment of a method for using identity based features to detect transaction fraud with trained ML fraud detection models.

FIG. 6 is a flow diagram of one embodiment of a method 600 for using identity based features to detect transaction fraud with trained ML fraud detection models. The method 600 is performed by processing logic that may comprise hardware (circuitry, dedicated logic, etc.), software (such as is run on a general purpose computer system or a dedicated machine), firmware, or a combination. In one embodiment, the method 600 is performed by a commerce platform system (e.g., commerce platform 110 and/or 200).

Referring to FIG. 6, processing logic begins by receiving a transaction having transaction data (processing block 602). The transaction data may be transaction attributes, such as card number, user email, user ID, tracking cookie, name on card, etc. received, extracted, or inputted during a transaction of a user processed using the services of a commerce platform.

Processing logic determines an identity based on the transaction data (processing block 604). In an embodiment, processing logic matches one or more elements of the transaction data with node/identity attributes in an identity graph. Processing logic may then access a feature set for the determined identity from stored identity based feature sets (e.g. processing block 508). However, in some embodiments, rather than accessing stored feature sets for an identity, processing logic generates the feature set from the attribute/nodes of the determined identity, as discussed herein.

With the feature set, processing logic performs an ML based fraud analysis based on the transaction data and the feature set for the determined identity to determine a level of fraud risk associated with the transaction (processing block 608). In embodiments, the ML analysis uses trained ML models to score, generate a probability, predict a likelihood, etc. that given the transaction data and the feature set, whether the transaction is fraudulent. Then, the transaction can be executed based on the determined fraud risk (processing block 610). In embodiments, the fraud risk may be compared to one or more fraud thresholds to determine whether a determined risk is acceptable or not. Then, based on such a comparison, the transaction is allowed to proceed or not.

Figure 7:
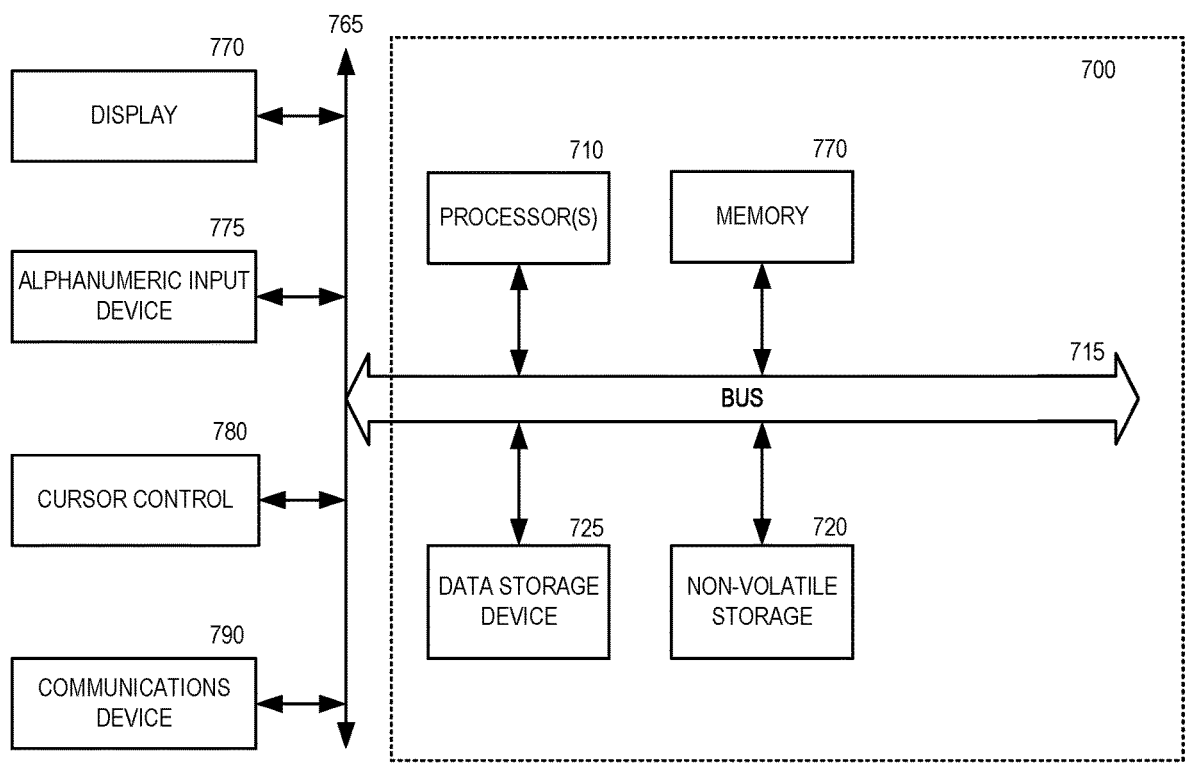
FIG. 7 is one embodiment of a computer system that may be used to support the systems and operations discussed herein.

FIG. 7 is one embodiment of a computer system that may be used to support the systems and operations discussed herein. For example, the computer system illustrated in FIG. 7 may be used by a commerce platform system, a merchant development system, merchant user system, etc. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The embodiments discussed herein may also be embodied in a handheld or portable device containing a subset of the computer hardware components described above. For example, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for fraud detection during transactions using identity graphs, the method comprising:

training, by a commerce platform system, one or more fraud detection machine learning models based, at least in part, a set of identity based machine learning model feature sets and corresponding past transaction data for which a fraud detection has been made, wherein at least one of the set of identity based machine learning model feature sets comprises one or more transaction features derived from two or more different payment types associated with a single user, and wherein the past transaction data comprises a fraud detection result and transaction data associated with at least one of the two or more different payment types for a past transaction involving the single user from which the fraud detection result was generated, receiving, at the commerce platform system, a transaction from a user having initial transaction attributes and transaction data;

determining, by the commerce platform system, an identity associated with the user, wherein the identity is associated with additional transaction attributes not received with the transaction;

accessing, by the commerce platform system, a feature set associated with the initial transaction attributes and the additional transaction attributes, wherein the feature set comprises machine learning (ML) model features for detecting transaction fraud, and comprise transaction features associated with different payment types;

performing, by the commerce platform system, a machine learning model analysis using the feature set and the transaction data as input to the trained one or more fraud detection machine learning models to determine a likelihood that the transaction is fraudulent; and performing, by the commerce platforms system, the transaction when the likelihood that the transaction is fraudulent does not satisfy a transaction fraud threshold.

2. The method of claim 1, wherein transaction attributes comprise one or more of a card number used in the transaction, a personal identification number associated with the card used in the transaction, an email address of the user participating in the transaction, a commerce platform identifier for the user, and a cookie identifier collected from a computing device used in the transaction.

3. The method of claim 2, further comprising:
analyzing past transaction attributes from past transactions stored in a transaction data store; and
extracting identity subgraphs from the past transactions each comprising a node pair joined by an edge, wherein each node pair comprises a pair of transaction attributes and each edge comprises a relationship between the node pair determined based on a concurrence of the transaction attributes in a single transaction.

4. The method of claim 3, wherein each edge is undirected and unweighted.

5. The method of claim 3, further comprising:
generating, by a single computing system of the commerce platform system, identity subgraphs by ingesting a stream of the identity subgraphs and performing a serial connected components analysis on the identity subgraphs generated from the stream to join one or more identity subgraphs associated with users to form user identity graphs, wherein each formed user identity graph is an identity associated with one or more users of the commerce platform system;
periodically regenerating a plurality of new identity subgraphs for a period of time after the user identity graphs are formed; and
performing, by a plurality of computing systems of the commerce platform system in parallel, a distributed label propagation analysis of the new identity subgraphs using the formed user identity graphs to augment the formed user identity graphs by joining transaction attributes from the new identity subgraphs with associated user identity graphs.

6. The method of claim 5, further wherein after the ingesting and prior to the periodic regeneration, the method further comprises:
determining, for each user identity graph in the formed user identity graphs, a cluster size of said each user identity graph, wherein the cluster size is determined based on a number of transaction attributes forming said each user identity graph; and
filtering a first user identity graph out of the formed user identity graphs when a cluster size of the first user identity graph exceeds a maximum cluster size threshold.

7. The method of claim 5, further comprising:
for each identity generated by the commerce platform, accessing one or more transaction attributes from the user identity graph associated with the identity;
generating an identity based machine learning model feature set for said each identity, based at least in part, across one or more of the one or more transaction attributes of the user identity graph associated with the identity.

8. The method of claim 7, wherein the identity based machine learning model feature set for said each identity comprise a total transaction count across all transactions of said each identity, a total transaction fraud count across said each identity, a count of a total number of different cards associated with said each identity, and a count of a total number of countries from which cards are issued to said each identity.

9. The method of claim 1, further comprising:
performing, by the commerce platform system, the machine learning model analysis by feeding the feature set and the transaction data to the trained one or more fraud detection machine learning models, wherein the trained one or more fraud detection machine learning models determine the likelihood that the transaction is fraudulent based on the feature set and the transaction data.

10. The method of claim 1, wherein the trained one or more fraud detection machine learning models comprise a neural network machine learning model and a tree-based machine learning model each trained, at least in part, using identity based features, wherein each of the neural network machine learning model and the tree-based machine learning model make an independent fraud risk determination based on the feature set and the transaction data, and wherein the likelihood that the transaction is fraudulent is an ensemble decision that combines the independent fraud risk determinations made by the neural network machine learning model and the tree-based machine learning model.

11. The method of claim 1, wherein the transaction comprises a commercial transaction performed using a card number associated with a payment card tendered for the transaction by the user, and the transaction data comprises a transaction location, a transaction amount, and a merchant associated with the transaction.

12. A non-transitory computer readable storage medium including instructions that, when executed by a processor, cause the processor to perform operations for fraud detection during transactions using identity graphs, the operations comprising:
training by a commerce platform system, one or more fraud detection machine learning, models based, at least in part, a set of identity based machine learning model feature sets and corresponding past transaction data for which a fraud detection has been made, wherein at least one of the set of identity based machine learning model feature sets comprises one or more transaction features derived from two or more different payment types associated with a single user, and wherein the past transaction data comprises a fraud detection result and transaction data associated with at least one of the two or more different payment types for a past transaction involving the single user from which the fraud detection result was generated,
receiving, at the commerce platform system, a transaction from a user having initial transaction attributes and transaction data;
determining, by the commerce platform system, an identity associated with the user, wherein the identity is associated with additional transaction attributes not received with the transaction;
accessing, by the commerce platform system, a feature set associated with the initial transaction attributes and the additional transaction attributes, wherein the feature set comprises machine learning (ML) model features for detecting transaction fraud, and comprise transaction features associated with different payment types;

performing, by the commerce platform system, a machine learning model analysis using the feature set and the transaction data as input to the trained one or more fraud detection machine learning models to determine a likelihood that the transaction is fraudulent; and performing, by the commerce platforms system, the transaction when the likelihood that the transaction is fraudulent does not satisfy a transaction fraud threshold.

13. The non-transitory computer readable storage medium of claim 12, wherein transaction attributes comprise one or more of a card number used in the transaction, a personal identification number associated with the card used in the transaction, an email address of the user participating in the transaction, a commerce platform identifier for the user, and a cookie identifier collected from a computing device used in the transaction.

14. The non-transitory computer readable storage medium of claim 13, further comprising:

analyzing past transaction attributes from past transactions stored in a transaction data store; and extracting identity subgraphs from the past transactions each comprising a node pair joined by an edge, wherein each node pair comprises a pair of transaction attributes and each edge comprises a relationship between the node pair determined based on a concurrence of the transaction attributes in a single transaction.

15. The non-transitory computer readable storage medium of claim 14, wherein each edge is undirected and unweighted.

16. The non-transitory computer readable storage medium of claim 14, further comprising:

ingesting, by a single computing system of the commerce platform system, a stream of the identity subgraphs and performing a serial connected components analysis on the identity subgraphs in the stream to join one or more identity subgraphs associated with users to form user identity graphs, wherein each formed user identity graph is an identity associated with one or more users of the commerce platform system;

periodically regenerating a plurality of new identity subgraphs for a period of time after the user identity graphs are formed; and performing, by a plurality of computing systems of the commerce platform system in parallel, a distributed label propagation analysis of the new identity subgraphs using the formed user identity graphs to augment the formed user identity graphs by joining transaction attributes from the new identity subgraphs with associated user identity graphs.

17. The non-transitory computer readable storage medium of claim 16, further wherein after the ingesting and prior to the periodic regeneration, the method further comprises:

determining, for each user identity graph in the formed user identity graphs, a cluster size of said each user identity graph, wherein the cluster size is determined based on a number of transaction attributes forming said each user identity graph; and filtering a first user identity graph out of the formed user identity graphs when a cluster size of the first user identity graph exceeds a maximum cluster size threshold.

18. The non-transitory computer readable storage medium of claim 16, further comprising:

for each identity generated by the commerce platform, accessing one or more transaction attributes from the user identity graph associated with the identity;

generating an identity based machine learning model feature set for said each identity, based at least in part, across one or more of the one or more transaction attributes of the user identity graph associated with the identity.

19. The non-transitory computer readable storage medium of claim 18, wherein the identity based machine learning model feature set for said each identity comprise a total transaction count across all transactions of said each identity, a total transaction fraud count across said each identity, a count of a total number of different cards associated with said each identity, and a count of a total number of countries from which cards are issued to said each identity.

20. The non-transitory computer readable storage medium of claim 12, further comprising:

performing, by the commerce platform system, the machine learning model analysis by feeding the feature set and the transaction data to the trained one or more fraud detection machine learning models, wherein the trained one or more fraud detection machine learning models determine the likelihood that the transaction is fraudulent based on the feature set and the transaction data.

21. The non-transitory computer readable storage medium of claim 12, wherein the trained one or more fraud detection machine learning models comprise a neural network machine learning model and a tree-based machine learning model each trained, at least in part, using identity based features, wherein each of the neural network machine learning model and the tree-based machine learning model make an independent fraud risk determination based on the feature set and the transaction data, and wherein the likelihood that the transaction is fraudulent is an ensemble decision that combines the independent fraud risk determinations made by the neural network machine learning model and the tree-based machine learning model.

22. The non-transitory computer readable storage medium of claim 12, wherein the transaction comprises a commercial transaction performed using a card number associated with a payment card tendered for the transaction by the user, and the transaction data comprises a transaction location, a transaction amount, and a merchant associated with the transaction.

23. A commerce platforms system for performing fraud detection during transactions using identity graphs, comprising:

a memory; and a processor coupled with the memory configured to:

train one or more fraud detection machine learning models based, at least in part, a set of identity based machine learning model feature sets and corresponding past transaction data for which a fraud detection has been made, wherein at least one of the set of identity based machine learning model feature sets comprises one or more transaction features derived from two or mort different payment types associated with a single user, and wherein the past transaction data comprises a fraud detection result and transaction data associated with at least one of the two or more different payment types for a past transaction involving the single user from which the fraud detection result was generated receive a transaction from a user having initial transaction attributes and transaction data, determine an identity associated with the user, wherein the identity is associated with additional transaction attributes not received with the transaction, access a feature set associated with the initial transaction attributes and the additional transaction attributes, wherein the feature set comprises machine learning (ML) model features for detecting transaction fraud, and comprise transaction features associated with different payment types, perform a machine learning model analysis using the feature set and the transaction data as input to the trained one or more fraud detection machine learning models to determine a likelihood that the transaction is fraudulent, and perform the transaction when the likelihood that the transaction is fraudulent does not satisfy a transaction fraud threshold.

\* \* \* \* \*